US008849290B2

(12) United States Patent
Gao et al.

(10) Patent No.: US 8,849,290 B2
(45) Date of Patent: Sep. 30, 2014

(54) DEVICE-TO-DEVICE DISCOVERY AND OPERATION

(75) Inventors: Chun Yan Gao, Beijing (CN); Samuli Turtinen, Ii (FI); Sami-Jukka Hakola, Kempele (FI); Timo K. Koskela, Oulu (FI); Hai Ming Wang, Beijing (CN)

(73) Assignee: Broadcom, Irvine, CA (US)

( * ) Notice: Subject to any disclaimer, the term of this patent is extended or adjusted under 35 U.S.C. 154(b) by 0 days.

(21) Appl. No.: 13/334,486

(22) Filed: Dec. 22, 2011

(65) Prior Publication Data

US 2013/0157656 A1 Jun. 20, 2013

(30) Foreign Application Priority Data

Dec. 19, 2011 (GB) .................................. 1121759.3

(51) Int. Cl.
*H04W 72/00* (2009.01)
(52) U.S. Cl.
USPC ..................... 455/450; 455/452.2; 455/550.1; 370/329
(58) Field of Classification Search
USPC ..................... 455/450, 452.2, 550.1; 370/329
See application file for complete search history.

(56) References Cited

U.S. PATENT DOCUMENTS

| 2006/0168343 | A1* | 7/2006 | Ma et al. ........................ 709/245 |
| 2007/0153747 | A1* | 7/2007 | Pan et al. ....................... 370/338 |
| 2009/0005057 | A1* | 1/2009 | Lee et al. ....................... 455/450 |
| 2009/0017797 | A1 | 1/2009 | Li et al. .......................... 455/458 |
| 2009/0017801 | A1* | 1/2009 | Laroia et al. ................ 455/414.1 |
| 2011/0149799 | A1* | 6/2011 | Wu et al. ........................ 370/254 |
| 2011/0268006 | A1* | 11/2011 | Koskela et al. ............... 370/312 |

FOREIGN PATENT DOCUMENTS

| WO | WO 2011/130630 A1 | 10/2011 |
| WO | WO-2012/006446 A1 | 1/2012 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V 10.3.0, Sep. 2011, 54 pgs.
"Study on LTE Device to Device Discovery and Communication-Service and System Aspects", TSG-RAN #52, RP-110708, May-Jun. 2011, 5 pgs.
"On the need for a 3GPP study on LTE device-to-device discovery and communication", Qualcomm Incorporated, 3GPP TSG-RAN #52, RP-110706, May-Jun. 2011, 2 pgs.
"Study on LTE Device to Device Discovery and Communication—Radio Aspects", TSG-RAN #52, RP-110707, May-Jun. 2011, 5 pgs.
"Advance in D2D Communications: Energy efficient Service and Device Discovery Radio", Klaus Doppler, et al., IEEE 2011, 6 pgs.
EP Search Report for corresponding GB Patent Application No. 1121759.3 mailed Apr. 25, 2012.

\* cited by examiner

*Primary Examiner* — Danh Le
(74) *Attorney, Agent, or Firm* — Stanton IP Law

(57) ABSTRACT

The specification and drawings present a method, apparatus and software related product (e.g., a computer readable memory) for improving device discovery and D2D operation, e.g., in LTE wireless systems, by using control signaling provided by a wireless network (e.g., by an eNB). The discovery channel/channels which conveys discovery signal/signals are configured by a network (e.g., by the eNB) and are mapped to control channel/channels (e.g., one-to-one). After sending/receiving the discovery signal/signals, the D2D devices are monitoring control channel/channels to get current information for establishing the D2D communication among these D2D devices, the current information may include a resource allocation for the D2D communication and a device list of candidates for establishing the D2D communication.

12 Claims, 6 Drawing Sheets

DEVICE-TO-DEVICE DISCOVERY AND OPERATION

RELATED APPLICATIONS

This Application claims priority to UK Patent Application Number GB 1121759.3 filed on Dec. 19, 2011.

TECHNICAL FIELD

The exemplary and non-limiting embodiments of this invention relate generally to wireless communications and more specifically to improving control signaling for device discovery and device-to-device (D2D) operation, e.g., in LTE wireless systems.

BACKGROUND ART

The following abbreviations that may be found in the specification and/or the drawing figures are defined as follows:
  CDM Code Division Multiplexing
  D2D Device-to-Device
  DL Downlink
  E-UTRA Evolved Universal Terrestrial Radio Access
  eNB, eNodeB Evolved Node B/Base Station in an E-UTRAN System
  E-UTRAN Evolved UTRAN (LTE)
  FDM Frequency Division Multiplexing
  LTE Long Term Evolution
  LTE-A Long Term Evolution Advanced
  M2M Machine-to-Machine
  PDSCH Physical Downlink Shared Channel
  PDCCH Physical Downlink Control Channel
  PMCH Physical Multicast Channel
  PUCCH Physical Uplink Control Channel
  PUSCH Physical Uplink Shared Channel
  RNTI Radio Network Temporary Identifier
  Rx Reception, Receiver
  TDM Time Division Multiplexing
  Tx Transmission, Transmitter
  UE User Equipment
  UP Uplink
  UTRAN Universal Terrestrial Radio Access Network D2D communication is a promising application which could be used to improve the resource usage efficiency, reduce the power consumption at both eNB and UE sides, reduce the traffic in cellular networks, and possibly enable some new services in the future. A new study was proposed for D2D in 3GPP TSG-RAN #52 RP-110706, "On the need for a 3GPP study on LTE device-to-device discovery and communication", Qualcomm Incorporated, plenary, 31 May-3 Jun. 2011.

There are many motivations to introduce the D2D concept, e.g., it may save resources compared with communications via a network, reduce interferences and save power in devices due to low transmit power, shorten end to end delay, etc. But due to existence of the WiFi DIRECT technique which can realize the D2D function, the D2D communication in LTE has to be designed to be more powerful and efficient to compete. Some features expected from the LTE D2D include controlling interference by the eNB and more efficient resource utilization.

These features can be realized by designing an eNB controlled D2D operation, e.g., when a dedicated resource is allocated by the eNB for the D2D operation, and the eNB controls D2D mode configuration. However, if many devices are capable of the D2D operation, using eNB for control pairing and resource allocation for each device will cause a large burden on the eNB signaling. Moreover, in some cases, one user device initially has no desired counterpart to connect to for the D2D operation and it would like to know all the potential users around. In this case, letting the eNB inform other user devices requires accurate position information which may be unavailable. From this point of view, automatic discovery of other devices is desirable.

In order to enable automatic discovery of D2D devices, a dedicated channel may be reserved for that purpose. In this channel, some devices may send a specific signal having a predefined format, and then other devices listening on this channel would know about the existence of the transmitters. This dedicated channel is called the discovery channel and the specific signal is called the discovery signal. A discovery signal design has been discussed, e.g., in Doppler, K.; Ribeiro, C. B.; Kneckt, J., "Advances in D2D communications: Energy Efficient Service and Device Discovery Radio," Wireless Communication, Vehicular Technology, Information Theory and Aerospace & Electronic Systems Technology (Wireless VITAE), 2011 2nd International Conference on, vol., no., pp. 1-6, Feb. 28 2011-Mar. 3, 2011; R. Larola et al., "Performing Paging in a Wireless Peer-to-Peer Network", US Patent Application Publication No. 2009/0017843; and J. Li et al., "Paging a Peer in a Peer-to-Peer Communication Network", US Patent Application Publication No. 2009/0017797.

After device discovery when interested device/devices are found, still further steps may be required before the actual D2D communication can begin between the devices, which include (but are not limited to): obtaining confirmation that the target device/devices accept/accepts the D2D link setup, and getting resources for the D2D operation.

Since the discovery signal from a single transmitter can be detected by multiple receivers, and one device may detect multiple discovery signals, some coordination is needed. Moreover, it is hard if not impossible for a device to transmit its own discovery signal while detecting discovery signals from other devices if resources for discovery signals are in same frequency band. Thus in order to enable devices to be able detect each other, the discovery signal may be, e.g., time division multiplexed, or the discovery resource may be hopped in time during a certain period. For example, in TDM, the device doesn't transmit simultaneously with at least some other devices in every discovery signal transmission occasion within the period. However, TDM will require a large amount of resource and a long time will be needed for one device to detect all potential discovery signals.

Thus, a device capable of the D2D operation may try to send the discovery signal to be detected by other devices, and try to detect discovery signals from further devices to find interested device/devices to pair with. However, letting each device send the discovery signal may require too much resources, and will make the detection period very long considering a large number of devices in the system. Moreover, the required coordination may be complex. Thus, more efficient device discovery signaling and coordination for the D2D communication is needed.

SUMMARY

According to a first aspect of the invention, a method comprises: transmitting or receiving by a first device a device-to-device discovery signal on a discovery channel; mapping the discovery channel to one control channel; and monitoring the one control channel for information comprising a resource allocation for device-to-device communications.

According to a second aspect of the invention, a method comprises: configuring by a network element a plurality of discovery channels, each discovery channel of the plurality of the discovery channels being mapped to one control channel; receiving by the network element an indication from a device about detecting a device-to-device discovery signal on one discovery channel of the plurality of discovery channels; and transmitting by the network element information on a control channel mapped from the one discovery channel, the information comprising a resource allocation for device-to-device communications.

According to a third aspect of the invention, an apparatus comprises: at least one processor and a memory storing a set of computer instructions, in which the processor and the memory storing the computer instructions are configured to cause the apparatus to: transmit or receiving by a first device a device-to-device discovery signal on a discovery channel; map the discovery channel to one control channel; and monitor the one control channel for information comprising a resource allocation for device-to-device communications.

According to a fourth aspect of the invention, an apparatus comprises: at least one processor and a memory storing a set of computer instructions, in which the processor and the memory storing the computer instructions are configured to cause the apparatus to: configure a plurality of discovery channels, each discovery channel of the plurality of the discovery channels being mapped to one control channel; receive an indication from a device about detecting a device-to-device discovery signal on one discovery channel of the plurality of discovery channels; and transmit information on a control channel mapped from the one discovery channel, the information comprising a resource allocation for device-to-device communications.

According to a fifth aspect of the invention, a computer readable memory encoded with computer readable instructions recorded thereon comprising: code for transmitting or receiving by a first device a device-to-device discovery signal on a discovery channel; code for mapping the discovery channel to one control channel; and code for monitoring the one control channel for information comprising a resource allocation for device-to-device communications.

According to a sixth aspect of the invention, a computer readable memory encoded with computer readable instructions recorded thereon comprising: code for configuring by a network element a plurality of discovery channels, each discovery channel of the plurality of the discovery channels being mapped to one control channel; code for receiving by the network element an indication from a device about detecting a device-to-device discovery signal on one discovery channel of the plurality of discovery channels; and code for transmitting by the network element information on a control channel mapped from the one discovery channel, the information comprising a resource allocation for device-to-device communications.

BRIEF DESCRIPTION OF THE DRAWINGS

For a better understanding of the nature and objects of the present invention, reference is made to the following detailed description taken in conjunction with the following drawings, in which.

DETAILED DESCRIPTION

Figure 1:
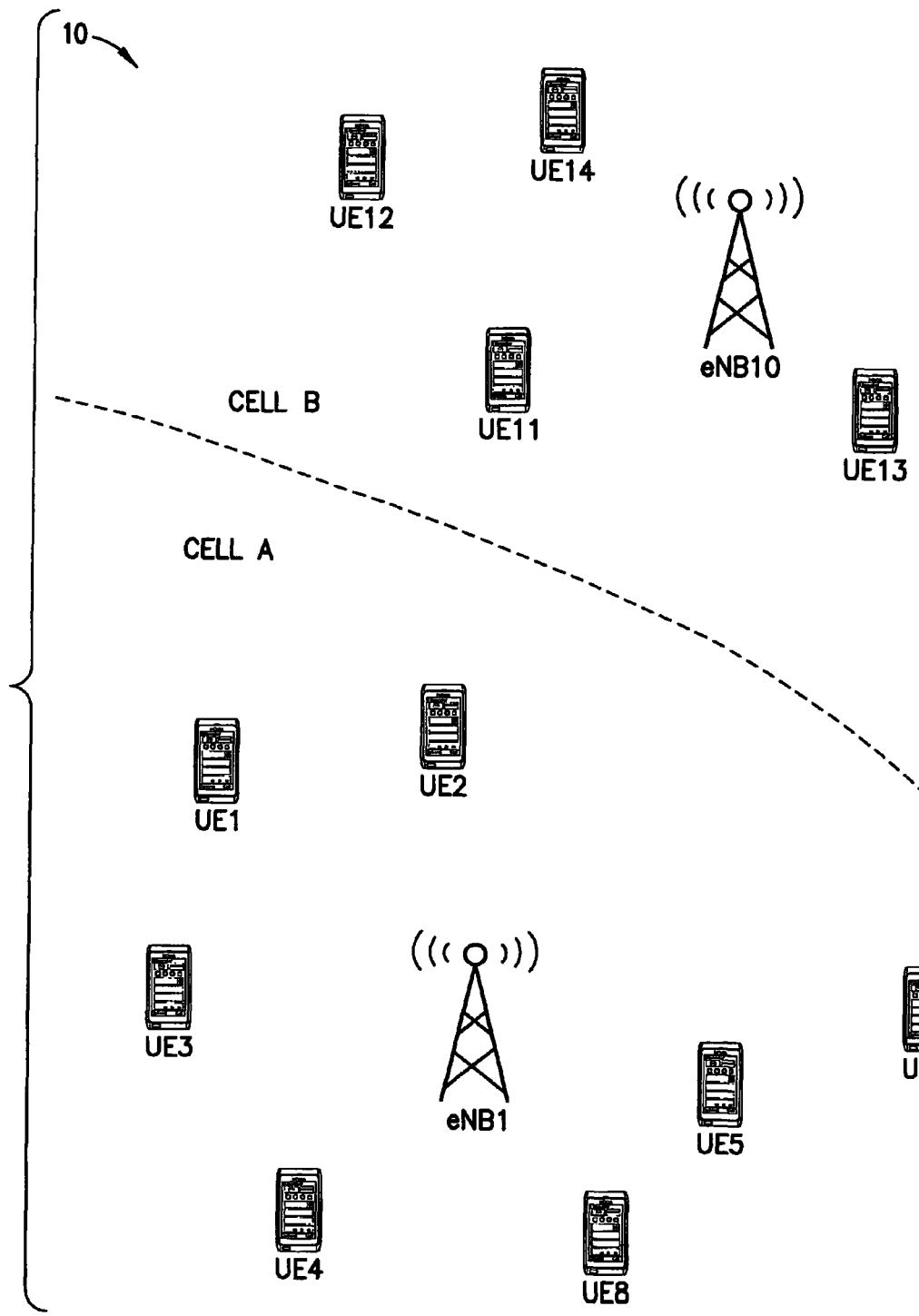
FIG. 1 is a schematic diagram showing a wireless system with a group of seven UEs under one cell A and adjacent to another cell B with four UEs, in which exemplary embodiments detailed herein, may be practiced to advantage.

A new method, apparatus, and software related product (e.g., a computer readable memory) are presented for improving device discovery and D2D operation, e.g., in LTE wireless systems, by using control signaling provided by a wireless network (e.g., by the eNB). This allows improving the resource efficiency of the device discovery, simplifying the device operation and reducing the device power consumption. For the purpose of this invention it is assumed that the discovery channels (e.g., resource/resources, period, etc.) which conveys discovery signal/signals are configured by a network (e.g., by the eNB).

According to a first embodiment, each discovery channel of a plurality of discovery channels is mapped (e.g., implicitly) by the network (e.g., by the eNB) to one control channel (e.g., using one-to-one mapping), which is used by the network to configure D2D operation between devices/UEs, such as a transmitter (UE-1) and/or receivers (UE-2) of the discovery signal, on one of the plurality of discovery channels. To get a control channel signal, the information on a control channel resource (distinguished from other resources in time-frequency-code domain) and information on the scrambling code, if available, need to be known for the corresponding mapping. The mapping is predefined and known to all devices. The mapping may be provided, e.g., by:

a) sending on the control channel, e.g., by the eNB, information which is scrambled with a code determined by a discovery channel ID; it is assumed that the resource for the control channel is predefined or configured via broadcast signaling, while the mapping here is a function which gets the scrambling code for detecting the control channel based on the discovery channel ID, or b) the control channel information may be sent using the resource determined by the discovery channel ID; in other words, the mapping here is a function which provides the resource of the control channel.

In other words, for (a) it is a mapping from the discovery signal to one identification code and for (b) it is a mapping from the discovery signal to a control resource.

Moreover, information on the control channel from the eNB may be sent periodically, and the period may be different from that of the discovery signal.

The information sent on the control channel/channels from the network element (eNB) may be generated/updated based on the received indication from the receiver/receivers (called receiving UE/UEs) of the discovery signal/signals, and/or some information from transmitter/transmitters (called transmitting UE/UEs) of the discovery signal/signals (e.g., the transmitting UE capabilities, transmitting UE position, etc.). For example, the transmitting UE may send some information to the eNB via macro network connection.

The content (information) of the one control channel from the network (e.g., from the eNB) may include, but is not limited to:

a) a device list which include candidates for establishing the D2D communication; for example, the candidates may be near (in the proximity of) the transmitter device of the discovery signal (e.g., being closer than a predefined distance to the transmitter device) and wishing to respond to the discovery signal, and b) a resource allocation for the device-to-device communication at least between the transmitter device and one of the receiver devices or among any candidates in the list (e.g., between receiver devices) which is coordinated by the transmitter device.

The advantages of this first embodiment may include but are not limited to: a) requiring only one control channel to configure D2D operation of multiple devices, which are transmitter and receivers of one discovery signal (to save resource for the control channel), b) implicit mapping between the discovery channels and control channels (e.g., on-to-one mapping), so that both transmitter and receivers know where to monitor the control channel from the network (eNB), without signaling overhead and without ambiguity, and c) the device list from the eNB of candidates for establishing the D2D communication may enable any device in the list to discover more interested devices to pair with besides the transmitter device of the discovery signal.

According to a second embodiment, the mapping is like in the first embodiment. However, in this second embodiment each device is configured to be a transmitter or only a receiver of the discovery signal, so that the configured receiver is not allowed to transmit the discovery signal. Then a device configured as the transmitter of the discovery signal may choose one discovery channel out of the plurality of the discovery channels (or use a discovery channel configured by the eNB) to send the discovery signal. After sending, the transmitter device will try to detect the corresponding control channel from the eNB. Devices configured as receivers may blindly detect discovery signals, and send an indication of the detection of the successfully detected discovery signals to the eNB. The transmission of this indication may be implemented as one normal LTE UL transmission, e.g., on PUSCH or PUCCH. According further to this second embodiment, the receiver of the discovery signal may not always send the indication to the network (eNB) once a discovery signal is detected. Instead it may indicate to the eNB only when in the future the receiver device would like to be involved in the D2D communication (e.g., coordinated by the transmitter of the discovery signal).

But if the indication to the network is sent, then the receiver devices will monitor the control channel which maps from the corresponding discovery channel used for the discovery signal after the discovery signal had been successfully detected and reported to the network (the information provided by the network on the control channel in the second embodiment may be similar to the information provided by the network in the first embodiment.

It is further noted that in this second embodiment before getting information on the control channel comprising the resource allocation from eNB, the devices configured as transmitters may act in the same way as the devices configured as receivers, except in subframes for their discovery signal transmission. In other words, the devices configured as transmitters may monitor other discovery channels and the corresponding control channels.

The advantages of this second embodiment may include but are not limited to: a) only one transmission may be required to indicate multiple detected discovery signals (e.g., when the receiver device detected multiple discovery signals on different discovery channels), which may help to save transmission resources and UE power, and b) since only some devices (not all) may be configured as transmitters of the discovery signal, this may reduce a number of discovery resources (channels) for sending discovery signals by a limited number of transmitter devices and avoid unnecessary discovery signal transmission.

According to a third embodiment which may used in combination with the first and/or 2 embodiments) by detecting the control channel from the eNB, the transmitter and receivers of the corresponding discovery signal may get to know the devices allowed to communicate in the assigned resource which is indicated in the device list of candidates for establishing the D2D communication provided in the control channel information as discussed herein. Then one device (e.g., the transmitter device or any receiver of the discovery signal) may request to pair with any device in the same list, and the D2D communication may be coordinated by the transmitter of the corresponding discovery signal.

According to this third embodiment, the transmitter device of the discovery signal, i.e., the device acting as the coordinator, may be known by the other devices receiving the list, e.g., from the following indication: it may be indicated in the discovery signal implicitly or explicitly, and/or the coordinator (transmitter) device may be listed in a predetermined position in the device list comprised in the control channel information provided by the eNB, e.g., the first or last device in the list.

The advantages of this further embodiment may include but are not limited to: a) the devices which are transmitter or receivers of the same discovery signal may form a local network which helps to offload the normal cellular system traffic, and b) the transmitter acting as a coordinator of the D2D communication among the listed devices may remove the coverage problem since the transmitter had been detected by all the devices.

It is noted that various non-limiting embodiments described herein may be used separately, combined or selectively combined for specific applications.

FIG. 1 illustrates an exemplary wireless network 10 in which embodiments of these teachings may be practiced to advantage. Eight UEs, UE1-UE8, are under one cell A with eNB1 and adjacent to another cell B with eNB10 having four UEs UE11-UE14. The discovery signal for D2D communication may be sent by any of the UE1-UE8 or UE11-UE-14 to some other UE/UEs shown in FIG. 1 to establish D2D communication. It is further noted that in LTE wireless systems, FDM, TDM and CDM are all available which may provides the possibility to increase the discovery signal multiplexing capacity.

It is noted that the embodiments described herein involving network participation for setting the D2D communication may be practiced within one cell, e.g., in cell A, where each UE out of the UE1-UE8 may establish D2D communication with another UE out of the UE1-UE7 in the cell A. However, the embodiments may be extended to establishing D2D communication between UEs in different cells (e.g., A and B) if, for example, the eNB1 and eNB10 may provide a coordination for assigning the same uplink resources and using the same/coordinated mapping between discovery and control channels.

Figure 2:
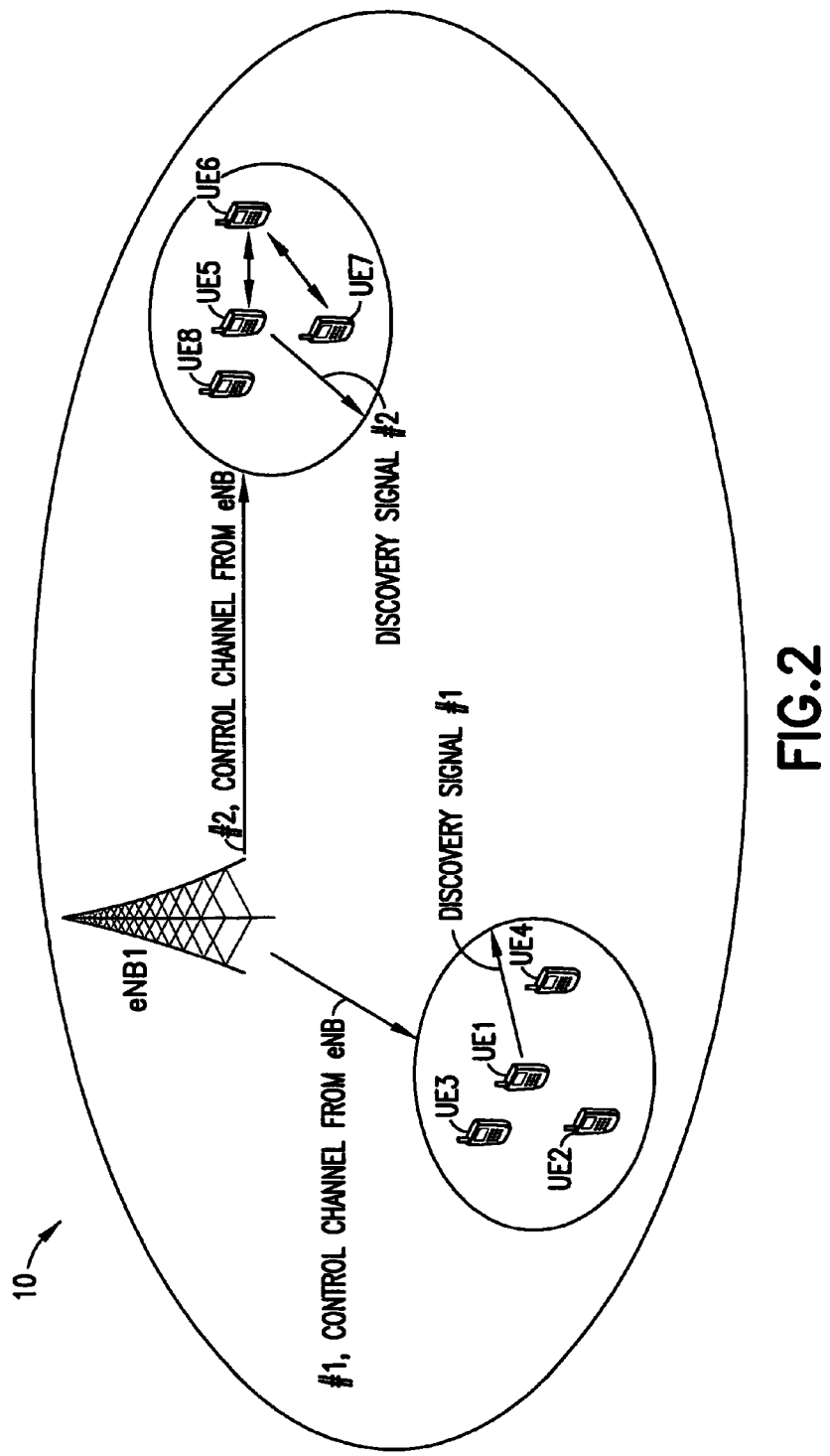
FIG. 2 is a schematic diagram showing D2D discovery/signaling operation, according to an embodiment of the invention.

FIG. 2 is an illustration for the D2D discovery/operation using embodiments described herein. In this example, two discovery channels are configured, and two control channels are reserved for configuration signaling from the eNB1 to UEs devices, one for configuring the transmitter device UE1 and receiver devices UE2-UE4 using the discovery channel

1, and another for configuring the transmitter device UE5 and receiver devices UE6-UE8 using the discovery channel #2.

Implementing the first embodiment described herein, the mapping from the discovery channel to the control channel may be implicitly derived. In one embodiment, the scrambling sequence used in the control channel may be a function of the discovery channel index. In the current 3GPP specification for LTE, TR 36.211 at Section 6.3.1, the scrambling for a DL channel (e.g., PDSCH) may be determined as follows:

$$\tilde{b}^{(q)}(i)=(b^{(q)}(i)+c^{(q)}(i)) \bmod 2 \qquad (1),$$

where $c^{(q)}(i)$ is the scrambling sequence and the scrambling sequence generator shall be initialized at the start of each subframe, where the initialization value of $c_{init}$ depends on the transport channel type according to $$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases}, \quad (2)$$

where $n_{RNTI}$ corresponds to the RNTI associated with the PDSCH transmission. Then according to one embodiment, the $n_{RNTI}$ in equation (2) may be replaced by a function of a discovery channel index, i.e., $f(Ind_{Discovery})$. In another embodiment, the resource used for the control channel transmission may be derived based on the discovery channel index.

In other words, the Equations (1) and (2) show an example related to the mapping format (a) described above. The discovery channel ID, as an input of Equation (2), may be used to generate a sequence, and the sequence may be used in Equation (1) to get a scrambling code applied to the control signal transmission which makes UEs to know whether this control signal is targeted signal for detection.

Figure 3:
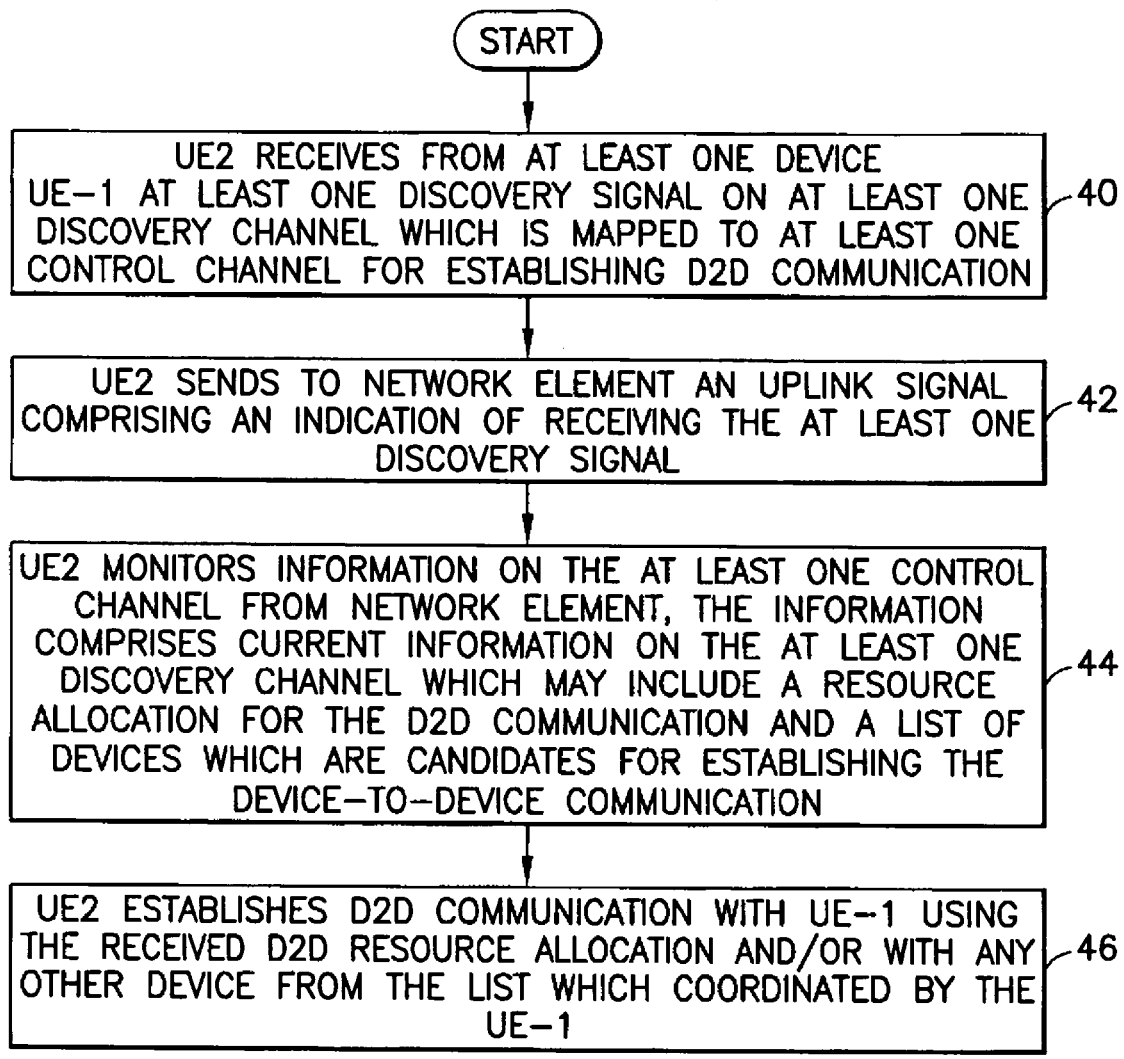
FIGS. 3-4 are flow charts demonstrating exemplary embodiments of the invention performed by UEs.

FIG. 3 shows an exemplary flow chart demonstrating D2D discovery performed by the UE receiving the discovery signal/signals according to exemplary embodiments disclosed herein. It is noted that the order of steps shown in FIG. 3 is not absolutely required, so in principle, the various steps may be performed out of the illustrated order. Also certain steps may be skipped, different steps may be added or substituted, or selected steps or groups of steps may be performed in a separate application.

In a method according to this exemplary embodiment, as shown in FIG. 3, in a first step 40, a UE2 receives from at least one device UE1 at least one discovery signal on a discovery channel which maps to at least one control channel for establishing D2D communication. In a next step 42, the UE2 sends to a network element (e.g., eNB) an uplink signal comprising an indication of receiving the discovery signal. In a next step 44, the UE2 monitors information on the control channel from the network element (e.g., from the eNB1 via the control channel #1 as shown in FIG. 2), the information comprises current information on the discovery channel which may include a resource allocation for the D2D communication and a list of devices which are candidates for establishing the device-to-device communication, as. In a next step 46, the UE2 establishes the D2D communication with the UE-1 using the received D2D resource allocation and/or with any other device from the list which is coordinated by the UE-1.

Figure 4:
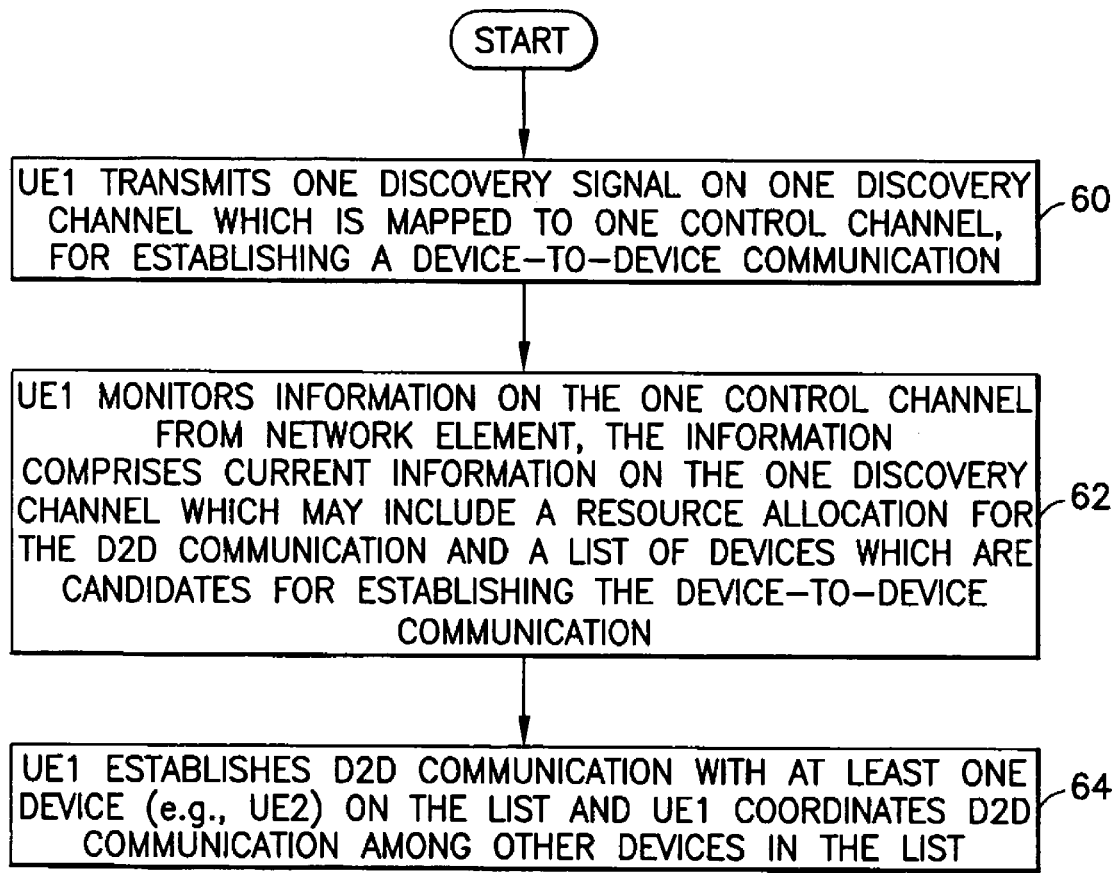

FIG. 4 shows an exemplary flow chart demonstrating D2D discovery performed by the UE transmitting the discovery signal according to exemplary embodiments disclosed herein. It is noted that the order of steps shown in FIG. 4 is not absolutely required, so in principle, the various steps may be performed out of the illustrated order. Also certain steps may be skipped, different steps may be added or substituted, or selected steps or groups of steps may be performed in a separate application.

In a method according to this exemplary embodiment, as shown in FIG. 4, in a first step 60, a UE-1 (e.g., the UE1 in FIGS. 1 and 2) transmits one discovery signal (e.g., the discovery signal #1 in FIG. 2) on one discovery channel which is mapped to one control channel (e.g., the control channel #1 in FIG. 2), for establishing a device-to-device communication. As shown in FIG. 2, the discovery signal sent by the UE1 may be received by the devices UE2-UE4 in a close proximity of the UE1. In a next step 62, the UE1 monitors information on the one control channel from the network element (e.g., from the eNB1 via the control channel #1 as shown in FIG. 2), the information comprises current information on the one discovery channel which may include a resource allocation for the D2D communication and a list of devices which are candidates for establishing the device-to-device communication. In a next step 64, the UE1 establishes D2D communication with at least one device (e.g., UE2) on the list and the UE1 coordinates D2D communication among other devices in the list (e.g., see Method 3).

Figure 5:
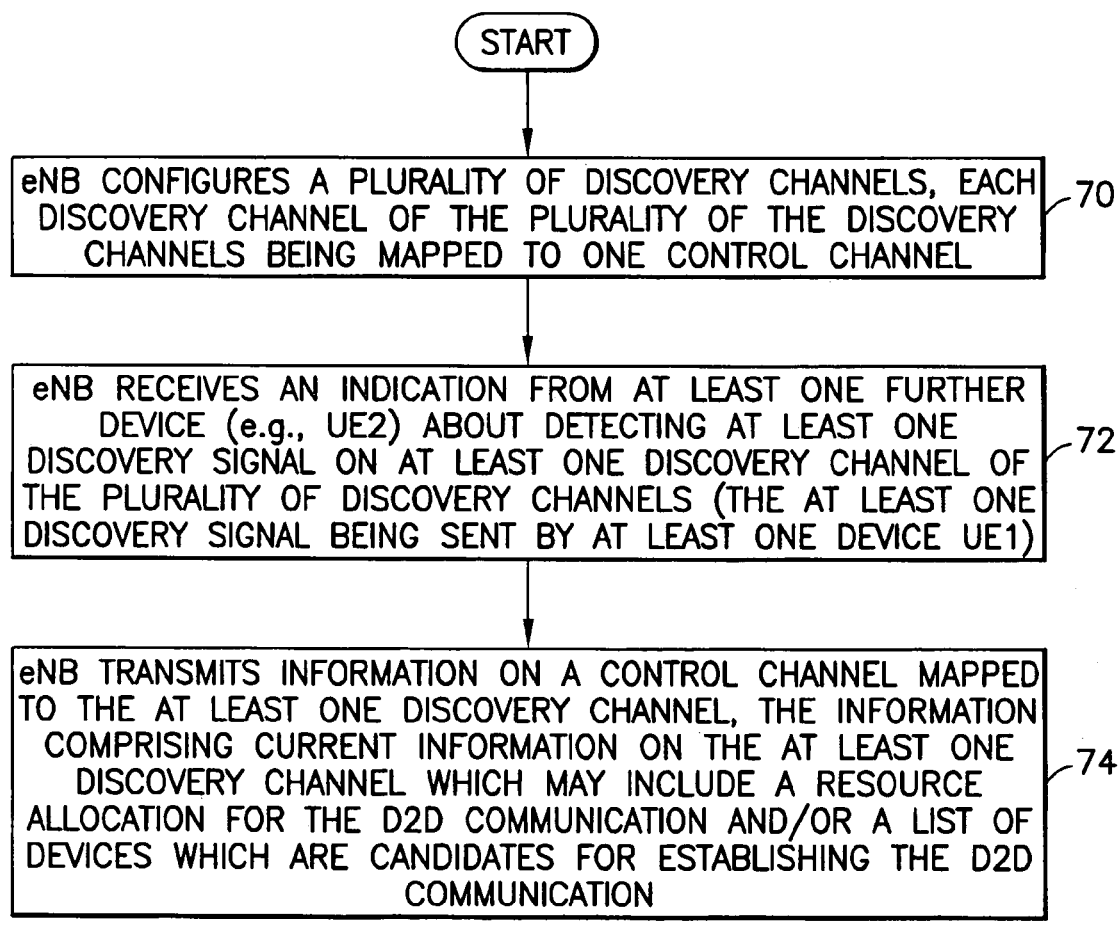
FIG. 5 is a flow chart demonstrating exemplary embodiments of the invention performed by a network element (e.g., eNB)

FIG. 5 shows an exemplary flow chart demonstrating performance of the network element (e.g., the eNB) for facilitating D2D discovery and communication of the mobile devices in the network, according to an exemplary embodiment of the invention. It is noted that the order of steps shown in FIG. 5 is not absolutely required, so in principle, the various steps may be performed out of the illustrated order. Also certain steps may be skipped, different steps may be added or substituted, or selected steps or groups of steps may be performed in a separate application.

In a method according to this exemplary embodiment, as shown in FIG. 5, in a first step 70, the eNB (e.g., eNB1 in FIGS. 1 and 2) configures a plurality of discovery channels (e.g., the discovery channels #1 and #2 in FIG. 2), each discovery channel of the plurality of the discovery channels being mapped to one control channel (e.g., the control channel #1 or #2 in FIG. 2). In a next step 72, the eNB receives an indication from at least one further device (e.g., the UE2 in FIG. 2) about detecting at least one discovery signal (e.g., sent by the UE1 in FIG. 2) on at least one discovery channel (e.g., the discovery channel #1 in FIG. 2) of the plurality of discovery channels. The eNB1 may also receive the indication about detecting the at least one discovery signal sent by the UE1 from other receiving devices (e.g., UE3-UE4 in FIG. 2). In a next step 74, the eNB transmits information on a control channel mapped to discovery channel, the information comprising current information on the at least one discovery channel (e.g., the discovery channel #1 in FIG. 2) which may include a resource allocation for the D2D communication and/or a list of devices which are candidates for establishing the D2D communication as disclosed in reference to step 46 (FIG. 3) and to step 64 (FIG. 4).

Figure 6:
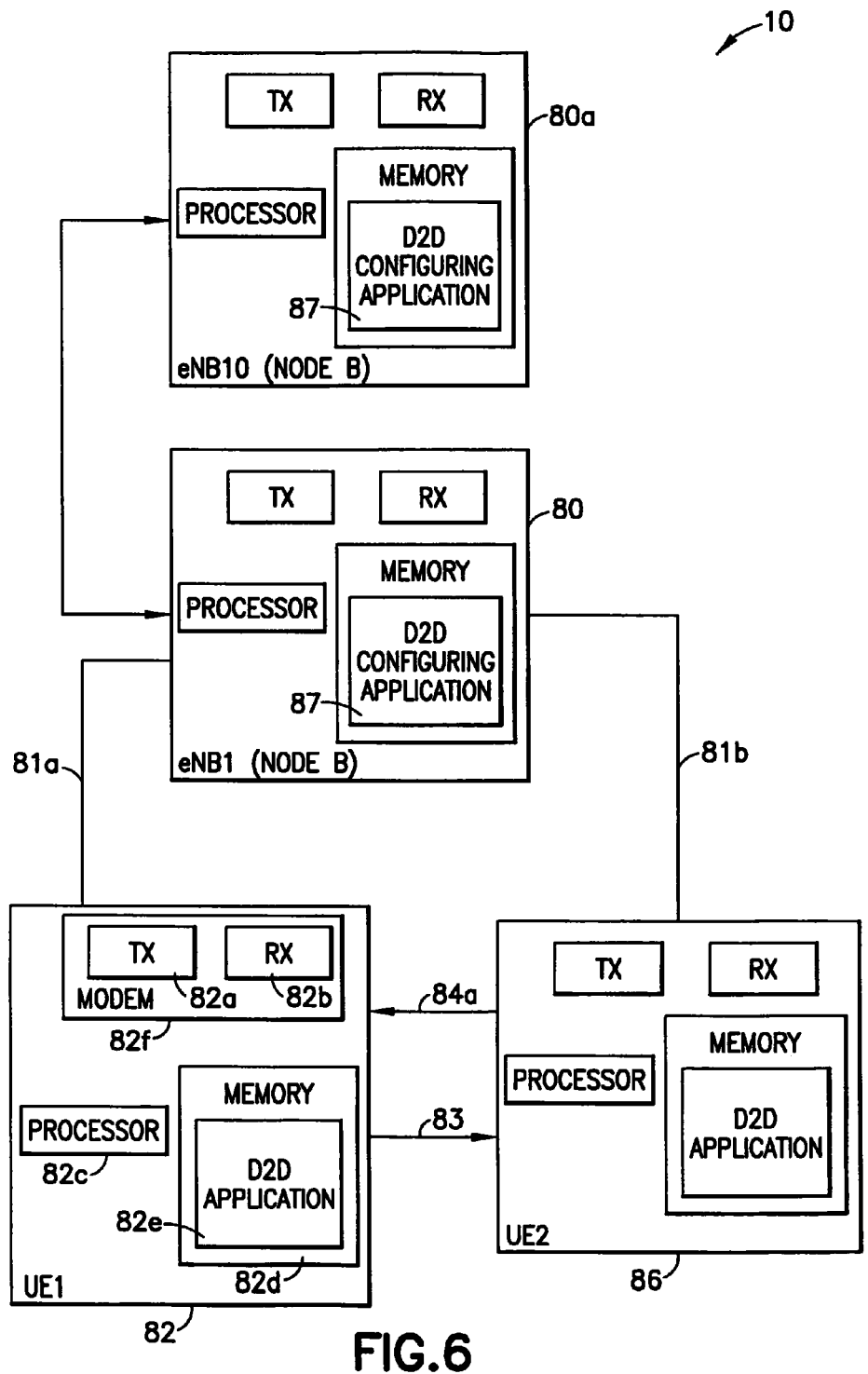
FIG. 6 is a block diagram of wireless devices for practicing exemplary embodiments of the invention.

FIG. 6 shows an example of a block diagram demonstrating LTE devices including an eNB1 80 and eNB10 80*a*, UE1 82 and UE2 86. The eNB1-eNB10 comprise a wireless comprised a wireless network 10. FIG. 6 is a simplified block diagram of various electronic devices and apparatus that are suitable for use in practicing the exemplary embodiments of this invention, and illustrate components of an electronic device which are configured to cause that electronic device to operate according to these teachings. Each of the UEs 82 and 86 may be implemented as a mobile phone, a wireless communication device, a camera phone, a portable wireless device and the like.

The UE1 82 (the same may be applied to the UE2 86) may comprise, e.g., at least one transmitter 82*a* at least one receiver 82*b*, at least one processor 82*c* at least one memory 82*d* and a D2D application module 82*e*. The transmitter 82*a* and the receiver 82*b* and corresponding antennas (not shown in FIG. 6) may be configured to provide wireless D2D communications with the UE2 86 (and others not shown in FIG. 6) and with eNB1 80, respectively, according to the embodiment of the invention. The transmitter 82*a* and the receiver 82*b* may be generally means for transmitting/receiving and may be implemented as a transceiver, or a structural equivalence (equivalent structure) thereof. It is further noted that the same requirements and considerations are applied to transmitters and receivers of the devices 86, 80*a* and 80*a*.

Furthermore, the UE1 82 may further comprise communicating means such as a modem 82*f*, e.g., built on an RF front end chip of the UE 82, which also carries the TX 82*a* and RX 82*b* for bidirectional wireless communications via data/control wireless links 81*a*, 83, 84*a*, for sending/receiving discovery signal and communicating with the eNB1 80. The same concept is applicable to other devices 80, 80*a* and 86 shown in FIG. 6.

Various embodiments of the at least one memory 82*d* (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 82*c* include but are not limited to general purpose computers, special purpose computers, microprocessors, digital signal processors (DSPs) and multi-core processors. Similar embodiments are applicable to memories and processors in other devices 86, 80*a* and 80*a* shown in FIG. 6.

The D2D application module 82*e* (in UE1 82 and/or UE2 86) may provide various instructions for performing steps 40-46 in FIG. 3 and/or steps 60-64 in FIG. 4. The module 82*e* may be implemented as an application computer program stored in the memory 82*d*, but in general it may be implemented as a software, a firmware and/or a hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor.

Furthermore, the module 82*e* may be implemented as a separate block or may be combined with any other module/block of the UE 82 or UE 86, or it may be split into several blocks according to their functionality.

The other UEs, such as UE2 86, eNB1 80 and eNB10 80*a* may have similar components as the UE 82, as shown in FIG. 5, so that the above discussion about components of the UE 82 is fully applied to the components of the UE2 86, eNB1 80 and eNB10 80*a*. A D2D configuring application module 87 in the devices 80 and 80*a*, is designed to facilitate performing corresponding functions for establishing D2D communication as described herein and illustrated in FIG. 6 (specifically see steps 70-74 in FIG. 6). The module 87 may be implemented as a software, a firmware and/or a hardware module or a combination thereof. In particular, in the case of software or firmware, one embodiment may be implemented using software related product such as a computer readable memory (e.g., non-transitory computer readable memory), a computer readable medium or a computer readable storage structure comprising computer readable instructions (e.g., program instructions) using a computer program code (i.e., the software or firmware) thereon to be executed by a processor.

Furthermore, the module 87 may be implemented as a separate block or may be combined with any other module/block of the device 80 or 80*a*, or it may be split into several blocks according to their functionality. Moreover, it is noted that all or selected modules of the device 82, 86, 80 or 80*a* may be implemented using an integrated circuit (e.g., using an application specific integrated circuit, ASIC).

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method comprising:
   blindly detecting by a first device a device-to-device discovery signal on a discovery channel;
   using the detected discovery signal to identify a second device as the sender of the discovery signal;
   mapping the discovery channel to one control channel;
   monitoring the one control channel for information comprising a resource allocation for device-to-device communications; and
   establishing the device-to-device communications with the second device based on the allocated resource.

2. The method of claim 1, wherein the information is received from a network access node and comprises a list of devices which are candidates for establishing the device-to-device communications.

3. The method of claim 2, wherein the device-to-device discovery signal is transmitted by the first device, and establishing of the device-to-device communications among the candidates is coordinated by the first device.

4. The method of claim 3, wherein the first device is identified by being in a predetermined position in the list or by a predefined indication in the device-to-device discovery signal.

5. The method of claim 2, wherein the candidates consist of devices which received the device-to-device discovery signal and are closer than a predefined distance to the first device.

6. The method of claim 1, wherein the first device is configured by a cellular network for transmitting on the discovery channel and the second device is configured by the cellular network for receiving on the discovery channel.

7. The method of claim 1, wherein the device-to-device discovery signal is received by the first device, and the method further comprises:
   sending by the first device to a network access node an uplink signal comprising an indication that the device-to-device discovery signal was received.

8. The method of claim 7, wherein the uplink signal is sent on a physical uplink control channel or a physical uplink shared channel.

9. The method of claim 7, wherein before sending the uplink signal, the method further comprises:
- receiving by the first device at least one further device-to-device discovery signal on at least one further discovery channel,
- wherein the uplink signal comprises a further indication of receiving the at least one further device-to-device discovery signal.

10. An apparatus comprising:
- at least one processor and a memory storing a set of computer instructions, in which the processor and the memory storing the computer instructions are configured to cause the apparatus to:
- blindly detect by a first device a device-to-device discovery signal on a discovery channel;
- using the detected discovery signal to identify a second device as the sender of the discovery signal;
- map the discovery channel to one control channel;
- monitor the one control channel for information comprising a resource allocation for device-to-device communications; and
- establishing the device-to-device communications with the second device based on the allocated resource.

11. The apparatus of claim 10, wherein the information is received from a network access node and comprises a list of devices which are candidates for establishing the device-to-device communications.

12. The apparatus of claim 10, wherein the device-to-device discovery signal is received by the apparatus, and the processor with the memory storing the computer instructions are configured to further cause the apparatus to:
- send to a network access node an uplink signal comprising an indication that the device-to-device discovery signal was received.

* * * * *

UNITED STATES PATENT AND TRADEMARK OFFICE
CERTIFICATE OF CORRECTION

PATENT NO. : 8,849,290 B2  
APPLICATION NO. : 13/334486  
DATED : September 30, 2014  
INVENTOR(S) : Gao et al.

Page 1 of 1

It is certified that error appears in the above-identified patent and that said Letters Patent is hereby corrected as shown below:

In the claims

Claim 10, column 11, line 19: Replace "using the detected discovery signal" with --use the detected discovery signal--.

Claim 10, column 12, line 5: Replace "establishing the device-to-device communications" with --establish the device-to-device communications--.

Signed and Sealed this
Thirty-first Day of March, 2015

Michelle K. Lee
*Director of the United States Patent and Trademark Office*